G. LEZCANO Y NEREY.
VEHICLE WHEEL TIRE.
APPLICATION FILED AUG. 22, 1917.
1,283,268.
Patented Oct. 29, 1918.
2 SHEETS—SHEET 1.
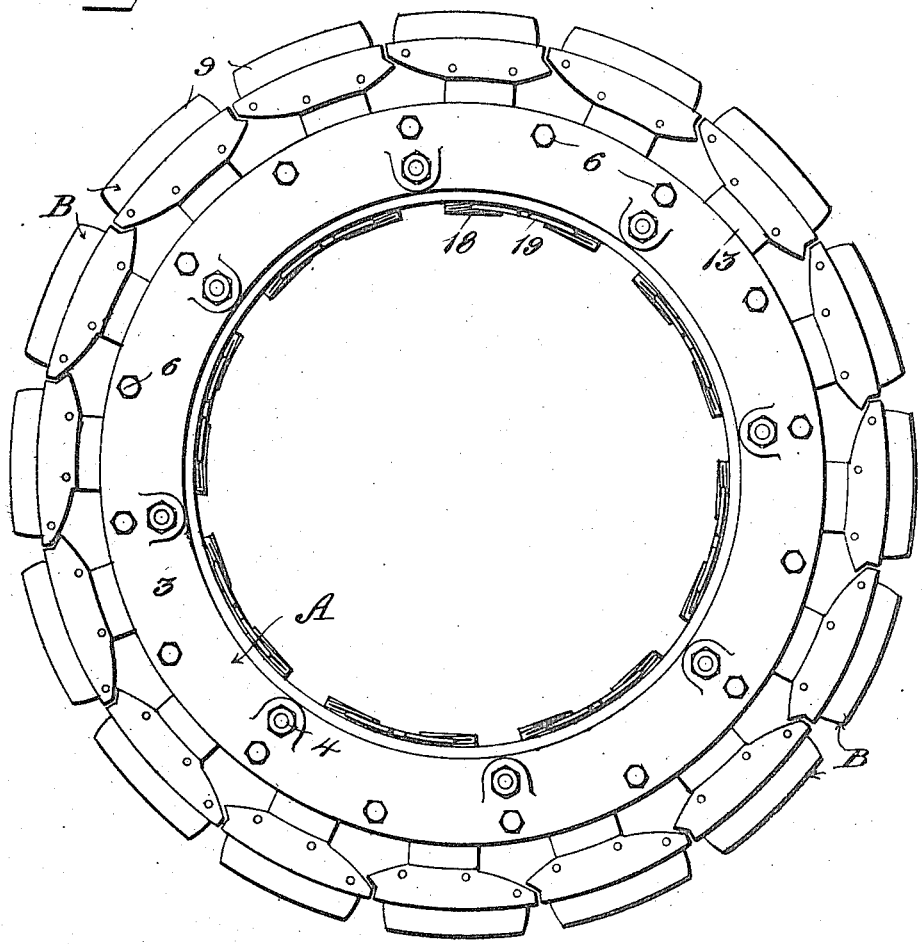
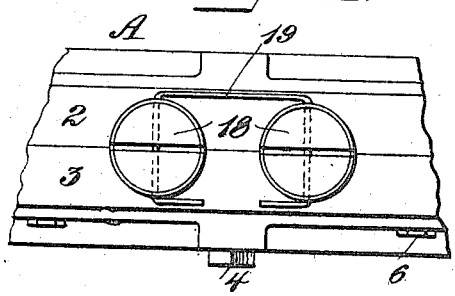
WITNESSES
H. T. Walker
C. Bradway.
INVENTOR
G. Lezcano y Nerey
BY
Munn Co.
ATTORNEYS

G. LEZCANO Y NEREY.
VEHICLE WHEEL TIRE.
APPLICATION FILED AUG. 22, 1917.

1,283,268.

Patented Oct. 29, 1918.
2 SHEETS—SHEET 2.

WITNESSES
H. T. Walker
C. Bradway.

INVENTOR
G. Lezcano y Nerey.
BY
ATTORNEYS

UNITED STATES PATENT OFFICE.

GUSTAVO LEZCANO y NEREY, OF HABANA, CUBA.

VEHICLE-WHEEL TIRE.

1,283,268.   Specification of Letters Patent.   Patented Oct. 29, 1918.

Application filed August 22, 1917. Serial No. 187,586.

*To all whom it may concern:*

Be it known that I, GUSTAVO LEZCANO Y NEREY, a citizen of the Republic of Cuba, and a resident of Habana, Cuba, have invented a new and Improved Vehicle-Wheel Tire, of which the following is a full, clear, and exact description.

This invention relates to vehicle tires of that type in which the tread is formed by a plurality of separate tire sections yieldingly mounted on the body or frame structure of the tire.

The invention has for its general objects to improve the construction of tires of this character so as to be of durable and substantial construction, reliable and efficient in use, and so designed that the resiliency can be readily regulated to insure the best cushioning effect for the vehicle.

A more specific object of the invention is the provision of a tire having a novel form of body or frame structure and novel construction of tire sections.

With such objects in view, and others which will appear as the description proceeds, the invention comprises various novel features of construction and arrangement of parts which will be set forth with particularity in the following description and claims appended hereto.

Figure 3:
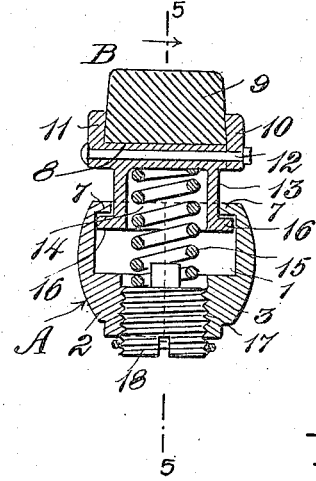
Figure 4:
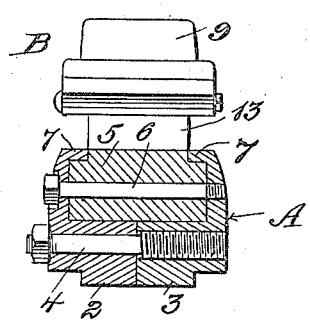
Figure 5:
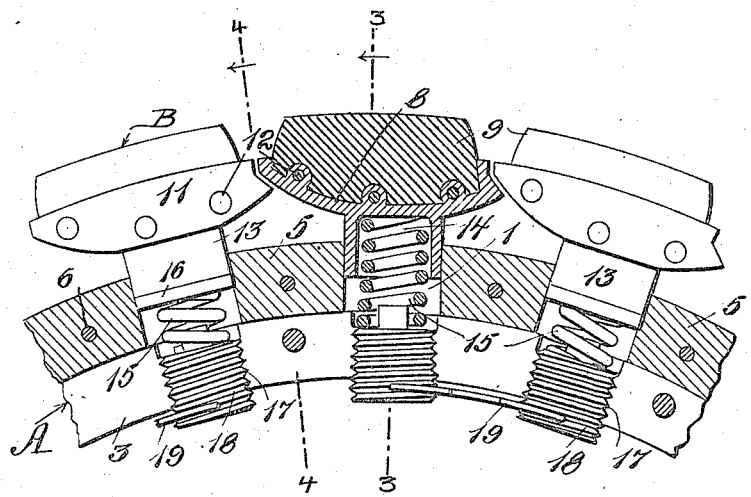

In the accompanying drawings, which illustrate one embodiment of the invention and wherein similar characters of reference indicate corresponding parts in all the views, Figure 1 is a side view of the tire;

Fig. 2 is a view of the inside portion of the tire, showing the means for adjusting the springs;

Figs. 3 and 4 are transverse sectional views respectively on the lines 3—3 and 4—4, Fig. 5; and Fig. 5 is a sectional view taken parallel with the plane of the wheel on the line 5—5, Fig. 3.

Referring to the drawing, the body or supporting structure of the frame comprises a ring A on which is mounted a plurality of radially yielding tread elements or sections B, which are movable in radial guideways or pockets 1 formed in the periphery of the frame or body A.

The frame or body A is divided into two annular sections 2 and 3 having the cross-sectional form shown in Figs. 3 and 4, and these sections are secured together by bolts 4. Between the two sections are filler blocks 5 which are clamped in place by the bolts 6, there being a filler block between adjacent pockets or guideways 1. The pockets or guideways are of approximately square cross-section and the lateral walls have inwardly extending flanges 7. These flanges extend entirely around the sections 2 and 3 and the filler blocks are cut away to interlock under the flanges so that the bolts 6 are not relied on to withstand the centrifugal strain.

The tread sections or elements B are each formed with a cup or chamber 8 in which is set a block of rubber 9. The wall 10 of each chamber 8 is removable, as shown in Fig. 3, and slightly undercut, as is the wall 11, so that the block of rubber 9 will be effectively clamped in place by the bolts 12 which hold the plates 10 in proper position. Each tread section B has a square stud or shank 13 slidable in its respective guideway or pocket 1 in the body A, and the stud 13 has a recess or chamber 14 which accommodates the outer end of a helical compression spring 15. The stud 13 has laterally extending flanges 16 which engage under the flanges 7 of the ring A, whereby the outward movement of the tread elements is limited. The ring A has a threaded opening 17 in line with each chamber 1, and in this opening is a screw 18 which forms an abutment for the spring 15 and serves as means for adjusting the tension of the spring. Looped wires 19 are passed through the screws 18 so as to prevent any change of adjustment. The tread sections B overlap each other at the ends, so that there is a progressive depression of the tire elements as the load is transferred from one to the other in the rotating of the wheel. The tread members yield inwardly as the load is sustained thereby, and as soon as the load is removed, they are returned to their normal condition, or spring outwardly. The tire is therefore effectively resilient and takes the place of the pneumatic tire without the numerous objections thereto.

The hub, spoke and rim structures of the wheel have been omitted as they form no part of the present invention.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof I desire to have it understood that the device shown is merely illustrative and that such changes may be made when desired as fall within the scope of the appended claims.

Having thus described my invention, I claim as new and desire to secure by Letters Patent:

A tire comprising a body structure formed of two annular members having their inner faces provided with grooves, spaced filler blocks engaged in the grooves, means for securing the blocks rigidly in position, whereby the ends of the blocks and the annular members form pockets, there being a threaded opening at the bottom of each pocket, a tread section having a non-circular shank extending into each pocket and each shank having laterally extending flanges engaging in the grooves of the said annular members, whereby the tread sections can move radially and are limited in their inward and outward movements by the flanges engaging the walls of the grooves, a spring arranged in each pocket to yieldingly urge the associated tread section outwardly and an adjustable abutment screwed into each pocket for adjusting the tension of the spring therein.

GUSTAVO LEZCANO Y NEREY.

Copies of this patent may be obtained for five cents each, by addressing the "Commissioner of Patents, Washington, D. C."